Patented Jan. 3, 1928.

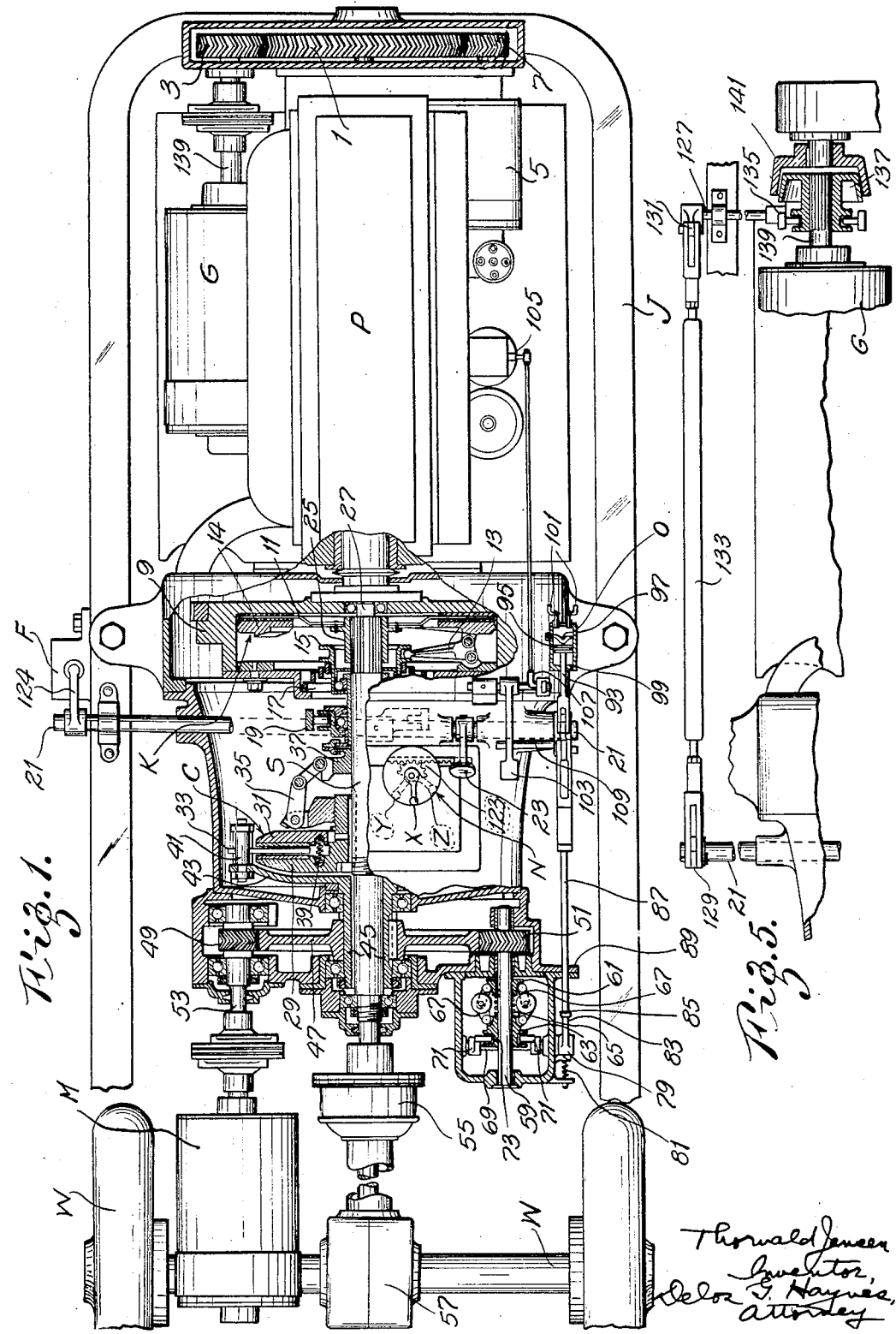

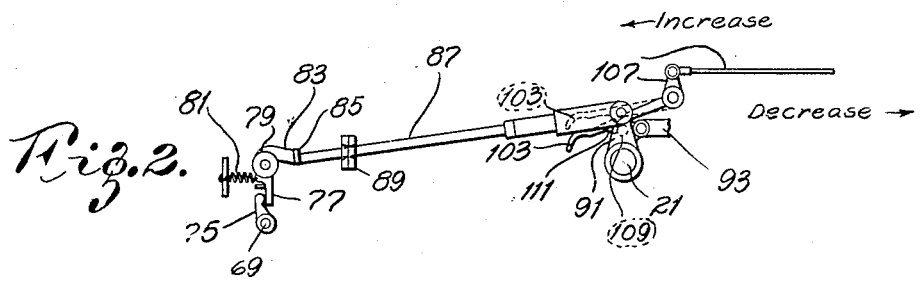
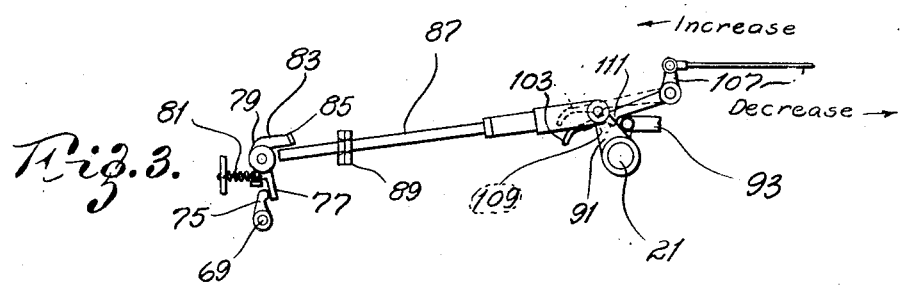
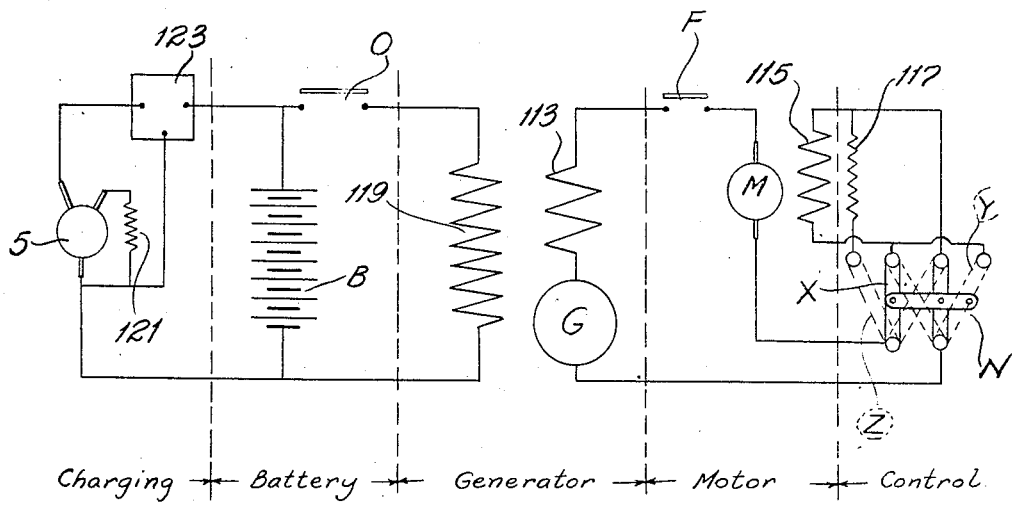

1,655,100

UNITED STATES PATENT OFFICE.

THORVALD JENSEN, OF ST. LOUIS, MISSOURI, ASSIGNOR TO THE WINTHER COMPANY, OF WILMINGTON, DELAWARE, A CORPORATION OF DELAWARE.

AUTOMOTIVE DRIVE.

Application filed April 12, 1926. Serial No. 101,257.

This invention relates to automotive drives, and with regard to certain more specific features to a combined electrical and mechanical drive for automotive vehicles and the like.

Among the several objects of the invention may be noted the provision of a combined mechanical and electrical drive for rail, highway and analogous vehicle applications, adapted to automatically vary the mechanical advantage from a prime mover to the driving wheels; the provision of a drive of the class described adapted to eliminate most of the usual wear on electrical driving parts; the provision of a drive of the class described, wherein the gear ratio between the driving electric motor and road wheels can be greatly increased and consequently the motor size and weight greatly reduced; and the provision of a drive of the class described adapted to provide high economies with regard to the initial investment, overhead charges and fuel consumption. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings in which is illustrated one embodiment of the invention, Fig. 1 is a plan view of the drive with parts broken away;

Fig. 2 is a diagrammatic side elevation of an interlock linkage shown in low electrical gear position;

Fig. 3 is a view similar to Fig. 2 showing the parts in high mechanical gear connection;

Fig. 4 is a wiring diagram showing typical electrical connections; and

Fig. 5 is a fragmentary plan view of certain modified parts of Fig. 1.

Similar reference characters indicate corresponding parts throughout the several views of the drawings.

Referring now more particularly to Fig. 1, there is diagrammatically illustrated at J a conventional chassis mounted on wheels and carrying thereon a prime mover P. The chassis is adapted to receive a conventional body (not shown) for carrying passengers, commodities and the like. A set of driving wheels for the vehicle is illustrated at W.

The prime mover P comprises an internal combustion engine or other type which, like the internal combustion engine, will not deliver high torques at low speeds, that is, an engine requiring a change in mechanical advantage from starting to running conditions of the vehicle. Today, this internal combustion engine represents engines of the above named class, and it is the internal combustion engine which has been found exceedingly suitable for driving vehicles, that is, from a standpoint of economies obtainable therefrom.

However, the internal combustion engine is open to the disadvantage that change gears are required to make its torque effective at low speeds. Hence, both road and rail vehicles employing such engines, at present require a cumbersome gear shifting operation at each start or period of acceleration from rest.

To overcome the objection to shifting gears, with the consequent uneven acceleration, the electric transmission has been employed between the engine and driving wheels. This has been found to give exceedingly smooth and fast acceleration while permitting the internal combustion engine to operate at its most economical speed range as regards fuel consumption. The said economical speed range for gasoline engines has rather narrow limits within which operation must be maintained for best economies at the engine.

On the other hand, the introduction of the electric drive between the internal combustion engine and the driving wheels has led to enormous losses caused by the electric system itself. The result is that the advantages obtained by omitting the usual gear shifting means are entirely offset by the electrical losses. For instance, the motors of the ordinary electric drive, connected to the driving wheels, will run approximately 70 to 75% of the power of the generator, the generator being connected to the driving engine. The actual loss between the engine and output end of the driving motor is approximately 25 to 30%.

It is evident that in a direct mechanical drive from the engine P to the driving wheels, that this loss is entirely eliminated, and since the efficiency of gears and gear systems are relatively high it is very desirable to make use of a direct or mechanical drive in some way, if possible. In the present invention both the electric and direct mechanical drive are used to their best advantage, and at periods when their full advantages are most easily obtained.

A further advantage accruing to the present invention is that while the electrical drive system is not in driving operation, the motor thereof is automatically prevented from rotating. Hence the motor or motors need not be mechanically designed for the higher vehicle speeds when the direct mechanical drive is used.

Referring again to Fig. 1, it will be seen that a power generator G is mounted with the prime mover P and is mechanically connected therewith by preferably herringbone gearing 1, 3. A lighting, ignition and battery-charging generator 5 is mechanically connected with the prime mover P by means of preferably herringbone gearing 1—7. The power generator G is designed to run at relatively high speeds for the purpose of cutting down the weight and cost thereof.

The prime mover P is direct connected with a mechanical driving clutch K. The clutch K comprises a driving case 9 rotating with the prime mover or engine P. The case 9 is adapted to be coupled and released from a driven disc 11 by means of a throw-out linkage 13, including a pressure plate 14, operable from a recessed sleeve assembly 15. The sleeve assembly 15 is longitudinally movable under action of a closing spring 17 and a manually operable shifter fork or yoke 19. The fork 19 is made fast to a rock shaft 21 operable from a foot pedal 23. Pressure on the pedal 23 is adapted to retract the sleeve assembly 15 against the reaction of the spring 17, whereby the linkage 13 is set to release the clamp plate 14. The disc 11 is therefore not driven from the engine driven case 9. When the pedal 23 is released, then the spring 17 expands to re-shut the clutch.

The driven plate 11 is fastened to a sleeve 25 which in turn is splined to the propeller shaft S. Hence when the clutch K is shut, then the propeller shaft S is driven directly from the prime mover P, and when the clutch is open, then said shaft is not so driven. The clutch K, is opened by depressing the pedal 23. A pilot bearing 27 is interposed between the driving and driven elements of the clutch.

Keyed to the shaft S is a driven disc assembly 29 which has a corresponding pressure plate 31 slidably arranged therewith, to clamp between them a driving disc 33. The members 29 and 31 are clamped on the plate 33 by means of a throw-out linkage 35 mounted on said assembly 29 and operable from a collar 37 arranged to move longitudinally with the sleeve assembly 15. The parts 29, 31, 33 and 35 comprise another clutch C. When the collar 37 is in a forward position, the clutch is open, and when it is in a rearward position, the clutch is closed. In other words, when the pedal 23 is manually depressed, then the mechanical driving clutch K is open and the electrical driving clutch C is closed. When said pedal is released, then the spring 17 causes closing of the clutch K and opening of the clutch C. A plurality of small springs 39 cause positive separation of the driven elements of clutch C when the clutch is opened.

The driving disc 33 of clutch C is slidably held on studs 41, mounted on a driving plate 43. The plate 43 is integrally formed with a sleeve 45 which is rotatably held in the housing of the described parts. This sleeve 45 also rotates with respect to the shaft S as there is clearance between the sleeve 45 and shaft S.

The sleeve 45 has a gear 47 keyed thereto which meshes with two pinions 49 and 51. These three gears are also preferably of the herringbone type. The gear 49 is carried on the drive shaft 53 of an electric driving motor M. It is evident that if electric energy is fed to the motor M and the clutch C is closed, that the motor may be caused to drive the propeller shaft S through shaft 53, gears 49, 47, sleeve 45, plate 43, and clutch C. The clutch K is then adapted to be opened as hereinbefore described. It is clear that several motors M might be connected with the shaft 53 or geared to the gear 47 and wired into the electric circuit to be described.

The propeller shaft S is in driving connection with the set of driving wheels W. Proper conventional universal joints 55 and a differential gear box 57 are placed in the line of drive.

The pinion 51 is keyed to a governor control shaft 59 which has also keyed fast thereto a collar 61. A second loose recessed collar 63 is normally held at a predetermined distance from the collar 61 by means of a governor spring 65. The collars 61 and 63 are pivotally joined by a plurality of two-bar linkages 67 weighted properly to act centrifugally at increased rates of speed. The centrifugal action of the weighted linkages 67 is adapted to draw the collar 63 toward the collar 61, against the pressure of the spring 65.

Below the governor shaft 59 is laterally mounted a latch bar 69 which has upstanding and laterally bent fingers 71 for engaging the recess 73 of the collar 63. The bar 69 extends outwardly of the case which holds the governor and there carries fast therewith an upwardly extending latch 75 (see also Figs. 2 and 3). The upper end or nose of the latch 75 cooperates with the downwardly extending arm 77 of a bell-crank interlock 79 pivoted to the side of the governor case. The arm 77 is normally held against the latch 75 by means of a tension spring 81. The other arm 83 of said bell-crank is provided with a flat nose 85 adapted to engage with the end of a rod 87 when the nose 85 is in its Fig. 2 position and to disengage the rod 87 when in its Fig. 3 position. The Fig. 2 position of the bell-crank is that corresponding to the rotation of the governor at a vehicle speed of say twenty-five miles per hour or less. At increased speeds above this, the governor throws the latch 75 to the Fig. 3 position, wherein the nose 85 is pushed clear of the rod 87.

The rod 87 is slidably held in a loose bearing 89 and its forward end is pivoted to a crank 91. The crank 91 is held fast to said clutch operating shaft 21. The crank 91 has also pivoted thereto a piston rod 93 having a piston 95 thereon engaging a dash-pot cylinder 97. The cylinder 97 has a metered exhaust 99. At one end of the cylinder 97 are mounted insulated terminals 101 of a main generator field excitation switch O. The closing bar or brush of the switch O is mounted on the piston 95 and is adapted to contact the switch terminals to close when the interlock linkage is in its Fig. 2 position. In the Figs. 1 and 3 positions of said linkage, the switch O is opened and the dash pot operative. The linkage is set to its Fig. 2 position by means of pressure on the pedal 23. It is held there by the nose 85 at lower speeds of the vehicle. At higher speeds the governor disengages the nose 85 and the said linkage is automatically thrown to its Figs. 1 and 3 position because of the return action of the spring 17. The foot should be off of the pedal 23 for automatic action, although no harm is done if it is left there. The action of the linkage may be timed for as easy or as quick an action as is desired, for the least loss of vehicle speed with the easiest clutch action. This is done by adjusting the dash-pot exhaust.

The speed of the engine P is governed from an accelerator pedal 103 which is connected with the carburetor throttle 105 by means of a linkage 107. A stop 109 fastened to the crank arm 91 engages the pedal 103 at the pedal's lower high-speed limiting position. A lug 111 located on the lower side of the pedal is adapted to be engaged by said stop 109 whenever the interlock linkage passes from its Fig. 2 electrical driving position, to its Fig. 3 mechanical driving position, that is, the accelerator pedal is automatically raised to decrease the engine speed, although a foot is positioned on said pedal 103. The amount and timing of speed decrease is predetermined by properly shaping and positioning the lug 111.

A manually operable electric controller N is provided having three handle positions X, Y and Z. Position X is for forward electrical movement, position Y for reverse electrical movement and position Z for a magnetic braking action of the motor M with a resistance in the circuit.

The wiring diagram illustrated in Fig. 4 comprises the main power generator G with its main series differential field 113 connected therewith. The motor M is wired in series with this circuit. Numeral 115 indicates the motor field which is adapted to be reversed by the controller N which is connected to a pair of the generator and motor terminals. The controller N has four terminals, one of which is connected to a resistance 117 in series with the motor. Corresponding letters X, Y and Z indicate corresponding connecting positions illustrated in Fig. 1. It is to be understood that if a plurality of motors M were used, they would preferably be connected in parallel. A switch F is wired in the motor-generator circuit for disconnecting purposes when mechanical driving conditions prevail. Its purpose is to positively prevent any residual action of the generator to turn the motor in either direction when the motor is not driving. The mechanical connections to the switch will be explained later.

Numeral 119 designates the main generator field. This field 119 is excited from the starting battery B upon closure of the circuit therebetween from the said automatic switch O. The generator 5, preferably of the three-brush type, is connected in circuit with the battery B. It is provided with a field 121. A conventional current cut-out 123 is provided in the battery circuit for connecting the generator to the battery at a predetermined voltage. It is evident that when the switch O is opened, that excitation of the generator field 119 ceases, whereat the generator C and motor M are electrically inoperative. However the battery B still receives a charge from the connected generator 5. The battery B is also used for starting and lighting purposes.

Fig. 1 illustrates that the switch F is operated to open and close by means of a lever 124 fastened to an extension of said shaft 21. The switch closes when the pedal 23 is depressed and opens when said pedal returns after release thereof.

Complete operation is as follows:

The prime mover P is started in the conventional manner by means of a starter or otherwise. The interlock linkage is in its Fig. 2 position; the clutch K is open, the clutch C is shut, the switches O and F are shut. The controller N is preferably set to an open position whereby the motor-generator circuit is open. The motor speed may be varied by depressing the accelerator pedal from its Fig. 2 dotted line position. It is evident that the pedal 23 must have been depressed in order to position the interlock system as shown in Fig. 2.

To start the vehicle forward, the controller N is closed to forward position X. If the pedal 103 is not depressed, the motor M will not receive enough energy from the idling engine-generator combination to move the vehicle. The brakes are next released and the accelerator pedal 103 is depressed to accelerate the engine P. This causes the main generator G to supply energy to the motor M in increased quantities, whereupon the motor M drives the vehicle through gears 49, 47, clutch C and propeller shaft S. The governor then goes into operation, turning at a rate proportional to the vehicle velocity. The generator field 119 is excited from the battery B because the switch O is closed. The pedal 103 may be depressed against the stop 109 to operate the engine at its maximum; or any other depression may be chosen. The electrical drive will adjust the advantage from engine to wheels automatically as the speed of the vehicle increases.

As the vehicle speed increases to a predetermined point, say to twenty-five miles per hour, then the governor will throw up the nose 85 to disengage the rod 87. The spring 17 is thus automatically relieved to cause closing of the clutch K and opening of the clutch C. The pedal 23 returns (Figs. 1 and 3) and with it the lever 91. This means that the stop 109 rides under the lugs 111 to raise the accelerator pedal 103, just as the clutch K goes into engagement. Hence an easy clutch action is had. The action of transition is further cushioned by the described dash-pot. As the clutch C is opened, so are the switches O and F, whereupon the field excitation of the generator G is practically reduced to zero and no energy flows to the motor M. Because the motor is disconnected from the propeller mechanism it does not rotate. This is also true of the governor mechanism. It should be understood that there is a short interval of time between the operations of clutches C and K when both of said clutches are open. Interference is thus prevented and provision for clutch adjustment afforded.

After the described automatic shift has taken place, the pedal 103 may again be manipulated to suit driving conditions. If grades or if other excessive resistances are encountered by the vehicle, such that the direct mechanical drive is ineffective, the electrical drive may be re-engaged merely by depressing the pedal 23. This closes the switches O and F and clutch C while opening clutch K. The nose 85 drops in behind the rod 87 to hold the mechanism as set, if the foot is removed from the pedal 23. The shift back to direct mechanical drive again takes place automatically as before. It is evident however, that the automatic shift can be manually resisted for any desired period merely by manually holding down the pedal 23. This feature may be of value during certain driving conditions requiring too frequent an automatic speed change, such as for instance on a grade just beyond the power of the engine where direct connection of the engine will not hold for a substantial period.

In order to brake magnetically it is only necessary to throw the controller into braking position Z and press down the pedal 23. This reverses the motor connections and throws in the resistance 117, while holding the motor M in electrical connection with the generator G, and in driving connection with the propeller shaft S. The result is that the motor is mechanically driven from the rear wheels against its tendency to reverse electrically. The resistance 117 is thrown into the motor field 115. Smooth and effective braking is thus had. The fact that the motor rotates at relatively high speeds during the short braking intervals is not mechanically deleterious because of the limited time element involved. The resistance 117 prevents electrical damage.

If reverse vehicle movement had been desired from standstill it would only have been necessary to set the controller N to its reverse position Y, after starting the engine, instead of to its forward position X. All other starting operations would be the same. However no shift should be made from electrical reverse, to direct drive because the direct drive operates forwardly. Therefore a rack and pinion combination 123 is attached to the bottom of the rotor of the controller N. The rack of said combination is adapted to pass in under the stem of pedal 23 when the controller is set to position Y. Hence the pedal 23 is prevented from returning and all other parts are prevented from taking a direct drive position. For reversing purposes low speeds and flexibility are generally most desirable, such as are had with the electrical drive. Braking in reverse is accomplished from the conventional manual friction braking equipment. This manual braking equipment may also be used for forward braking when occasion demands.

Fig. 5 illustrates means for also mechanically disconnecting the generator when the motor is mechanically disconnected. In this modification the said extension of the shaft 21 is adapted when oscillated, to oscillate a throw-out shaft 127. This is done through a conventional four-bar linkage comprising cranks 129, 131 and an adjustable connecting rod 133. The shaft 127 is provided with a shifter fork 135 for operating a driven cone clutch element 137. The element 137 is slidably splined to the generator shaft 139. A driving element 141 of said cone clutch is keyed to the shaft associated with the gear 3. It is evident from the drawing that when the pedal 23 is depressed, that the generator clutch is closed when the motor clutch C closes and the engine clutch K opens. Hence the generator is driven to provide motor current. When the pedal 23 returns, then the generator clutch opens with the motor clutch while the engine clutch closes. Hence neither the motor nor the generator rotate during the time of mechanical driving. With this modified construction no switch F is required.

In view of the above, it will be seen that the several objects of the invention are achieved and other advantageous results attained.

As many changes could be made in carrying out the above constructions without departing from the scope of the invention, it intended that all matter contained in the above description or shown in the accompanying drawings shall be interpreted as illustrative and not in a limiting sense.

I claim:

1. A vehicle drive comprising an engine, a propeller shaft for driving the vehicle, an engine clutch between the engine and said shaft, a driving motor, a motor clutch between said motor and shaft, means for manually opening the engine clutch and closing the motor clutch, and means for automatically opening the motor clutch and closing the engine clutch at a predetermined vehicle speed.

2. A vehicle drive comprising an engine, a propeller shaft for driving the vehicle, an engine clutch between the engine and said shaft, a driving motor, a motor clutch between said motor and shaft, means for manually opening the engine clutch and closing the motor clutch, and means for automatically opening the motor clutch and closing the engine clutch at a predetermined motor speed.

3. A vehicle drive comprising an engine, a propeller shaft for driving the vehicle, an engine clutch between the engine and said shaft, a driving motor, a motor clutch between said motor and shaft, means for manually opening the engine clutch and closing the motor clutch, and means for automatically opening the motor clutch and closing the engine clutch at predetermined motor and vehicle speeds.

4. A vehicle drive comprising an engine, a propeller shaft, a driving motor, an engine clutch between the said shaft and engine, and a motor clutch between the said shaft and motor, means for alternatively opening and closing said clutches, the said last-named means being manually operable to close the motor clutch and automatically operable to close the engine clutch, and a governor for controlling the automatic operation.

5. A vehicle drive comprising an engine, a propeller shaft, a driving motor, an engine clutch between the said shaft and engine, and a motor clutch between the said shaft and motor, means for alternatively opening and closing said clutches, the said last-named means being manually operable to close the motor clutch and automatically operable to close the engine clutch, and a governor for controlling the automatic operation, said governor being inoperable to prevent manual closing of the engine clutch at any time.

6. A vehicle drive comprising an engine, a manual control therefor, a propeller shaft, a driving motor, an engine clutch between the said shaft and engine and a motor clutch between said shaft and the motor, means for alternatively closing the clutches, comprising manual means to close the motor clutch while the engine clutch opens, and automatic means for closing the engine clutch when the motor clutch opens, said opening and closing means comprising a governor and interlock linkage operable therewith, and means associated with the said linkage for predeterminately preventing the manual engine control from being wrongly operated during repositioning of said clutches.

7. A vehicle drive comprising an engine, a manual control therefor, a propeller shaft, a driving motor, an engine clutch between the said shaft and engine and a motor clutch between said shaft and the motor, means for alternatively closing the clutches, comprising manual means to close the motor clutch while the engine clutch opens, and automatic means for closing the engine clutch when the motor clutch opens, said opening and closing means comprising a governor and interlock linkage operable therewith, means associated with the said linkage for predeterminately preventing the manual engine control from being wrongly operated during repositioning of said clutches, a generator driven by said engine, an electric circuit between the generator and the motor, and means associated with the said interlock linkage adapted to close said circuit, when the motor clutch is closed.

8. A vehicle drive comprising an engine and a generator driven thereby, a driving motor adapted to receve energy from the generator to drive, a propeller shaft, an engine clutch between the said shaft and the engine and a motor clutch between said shaft and the motor, a governor geared to the motor, means controlled by said governor for opening the motor clutch and closing the engine clutch, and a switch operable from said governor to open the generator-motor circuit when the motor clutch is open.

9. A vehicle drive comprising an engine and a generator driven thereby, a driving motor adapted to receive energy from the generator to drive, a propeller shaft, an engine clutch between the said shaft and the engine and a motor clutch between said shaft and the motor, a governor geared to the motor, means controlled by said governor for opening the motor clutch and closing engine clutch, a switch operable from said governor to open the generator-motor circuit when the motor clutch is open, and means for closing the motor clutch, opening the engine clutch and closing said switch regardless of the said governor control.

10. A vehicle drive comprising an engine and a generator, driven thereby, a driving motor adapted to receive energy from the generator to drive, a propeller shaft, an engine clutch between the said shaft and the engine and a motor clutch between said shaft and the motor, a governor geared to the motor, means controlled by said governor for opening the motor clutch and closing engine clutch, a switch operable from said governor to open the generator-motor circuit when the motor clutch is open, and means for closing the motor clutch, opening the engine clutch, and closing said switch regardless of the said governor control, and means associated with the clutch control adapted to decrease the engine speed as either of the clutches are closed.

11. A vehicle drive comprising an engine, a driving motor, a propeller shaft, an engine clutch between said shaft and the engine, a motor clutch between said shaft and the motor, means for alternatively operating said clutches, manually operable means for setting the clutch operating means to closed position of the motor clutch, automatically operable means for setting the clutch operating means to opened position of the motor clutch, a governor for controlling the automatic operable means, means for reversing the motor operation and an interlock between said last-named means and the clutch control for preventing closure of the engine clutch when the motor is operating in reverse.

12. A vehicle drive comprising an engine, a propeller shaft for driving the vehicle, an engine clutch between the engine and said shaft, a driving motor, a motor clutch between said motor and shaft, means for manually opening the engine clutch and closing the motor clutch, means for automatically opening the motor clutch and closing the engine clutch, the said manually operable means being adapted to be operated at any time and the automatically operable means at a predetermined vehicle speed.

13. A vehicle drive comprising an engine, a propeller shaft for driving the vehicle, an engine clutch between the engine and said shaft, a driving motor, a motor clutch between said motor and shaft, means for manually opening the engine clutch and closing the motor clutch, means for automatically opening the motor clutch and closing the engine clutch, the said manually operable means being adapted to be operated at any time and the automatically operable means at a predetermined motor speed.

In testimony whereof, I have signed my name to this specification this 9th day of April, 1926.

THORVALD JENSEN.